Dec. 13, 1949     H. ROISMAN     2,490,920
FILM VIEWER WITH INTERMITTENT MOTION
Filed Dec. 20, 1948
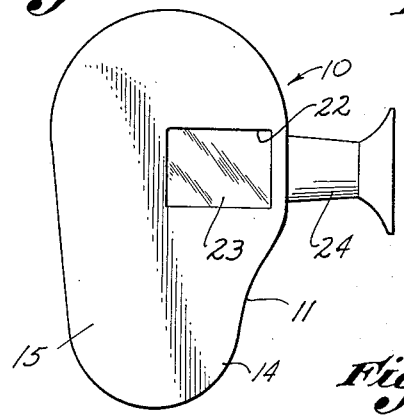
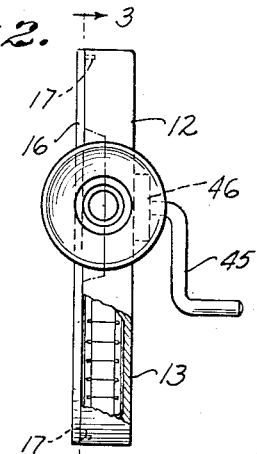
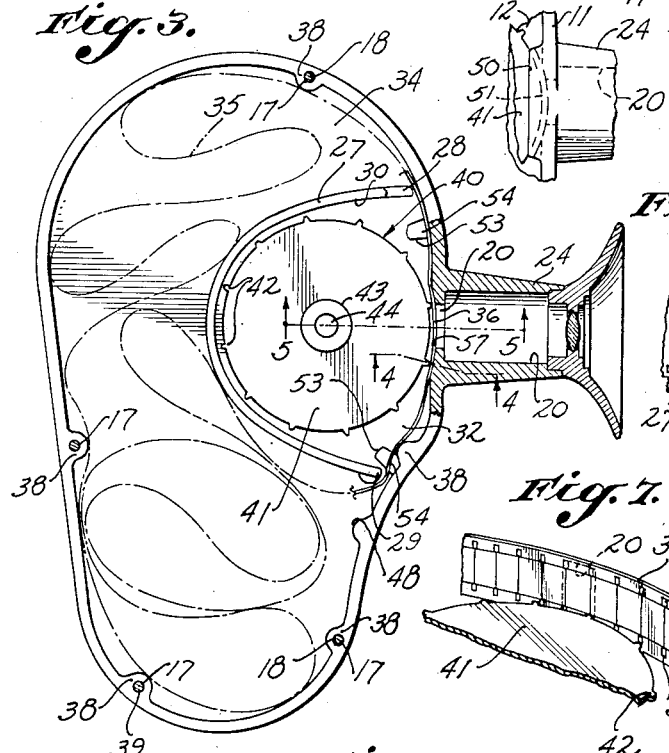
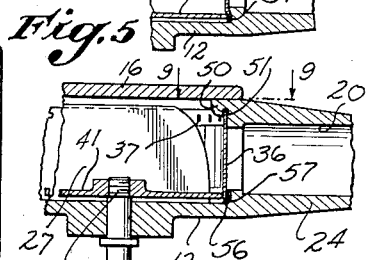
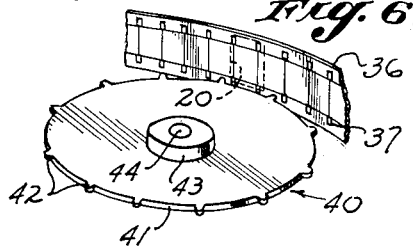
INVENTOR:
HARPER ROISMAN
BY HIS ATTORNEYS
HARRIS, KIECH, FOSTER & HARRIS
BY Ward D. Foster Patented Dec. 13, 1949

2,490,920

UNITED STATES PATENT OFFICE 2,490,920

FILM VIEWER WITH INTERMITTENT MOTION

Harper Roisman, Los Angeles, Calif.

Application December 20, 1948, Serial No. 66,295

12 Claims. (Cl. 88—18)

This invention relates to improvements in film-viewing devices and more particularly to a film-viewing device of the type which is adapted to permit the viewing of comparatively short lengths of diapositive motion picture film with transmitted light. My invention is especially pertinent to small viewers of the toy type and is simple in construction and mode of operation to permit its effective utilization by a child.

Although I will disclose the manner of construction and mode of operation of my invention in an embodiment which is primarily intended for use as a toy, it is conceivable that the principles of my invention may be utilized in more complex instruments, and I, therefore, do not intend to be limited to the details of the specific embodiment shown.

One of the primary requirements of any motion picture film viewer is the provision therein of some means which will permit the individual frame of the film being viewed to momentarily and intermittently pause adjacent the film-viewing aperture of the viewer in order that the eye may perceive the individual frames of the film and in order that a blurred image will not result from the continuous motion of the film past the film-viewing aperture. A wide variety of toy-type film viewers has been offered in the past, but the greater number of such viewers has been of a rather complex nature since intricate devices were utilized to achieve the intermittent movement of the frames of the film past the film-viewing aperture of the apparatus to secure the proper effect. Other prior art apparatus, while discarding intricately constructed and complex moving parts, have been so simplified as not to operate properly at all times.

It is, therefore, a primary object of my invention to provide a motion picture film viewer which has incorporated therein simple means adapted to cause the intermittent movement of the frames of the film in reference to the film-viewing aperture of the viewer which, while exceedingly simple in construction and mode of operation, are very efficient in the performance of the operation for which they were designed.

Another object of my invention is the provision of a motion picture film viewer which has incorporated therein film-moving means adapted to cause the intermittent movement of the frames of the film past the film-viewing aperture of the apparatus and film-retarding means adapted to hold the particular frame of the film which is in registry with the film-viewing aperture of the apparatus in frictional contact with the housing of the apparatus to prevent the inadvertent movement of the film during the interval of perception.

A further object of my invention is the provision of a motion picture film viewer which incorporates film-retarding means adapted to hold the film against inadvertent movement which is constituted by means such as an elongated depression adapted to receive and to distort a portion of the film and to frictionally retard the movement of the film by contact with said distorted portion thereof.

An additional object of my invention is the provision of a film-viewing apparatus of the above discussed type in which the film is moved intermittently past the film-viewing aperture in close contiguity thereto so that no reflected light will impair the image perceived through the film-viewing aperture.

An additional object of my invention is the provision of a motion picture film-viewing apparatus which is so constructed that a web of film may be speedily and easily inserted therein and which, therefore, is ideally suited to the needs of children who are incapable of threading film into more complex devices.

A further object of my invention is the provision of a film-viewing apparatus which is divided into two chambers, a first film-viewing chamber and a second film-containing chamber. The two chambers are so designed that the film may be easily and readily inserted in the film viewer's housing. An associated object of my invention is the provision of a film-viewing apparatus which has incorporated therein a film-containing chamber adapted to receive the major portion of the web of film in a convoluted and looped state, thus permitting the more or less haphazard insertion of the bulk of the film in the film-containing chamber.

A further object of my invention is the provision of a film-containing chamber for a film-viewing apparatus in which the frictional contact of various portions of the film with each other serves to augment the film-retarding effect of the film-retarding means discussed above.

An additional object of my invention is the provision of a motion picture film viewer which has incorporated in the film-containing chamber thereof film-dislodgement means which are adapted to prevent excessive frictional drag upon the surface of the film housed in said chamber.

Another object of my invention is the provision of a film-viewing apparatus which is simple in design and construction and which may be manufactured and sold at a moderate cost.

A further object of my invention is a method of inserting a length of film within a film-viewer housing which permits the elimination of reels and coiling devices and which permits a much longer length of film to be placed in the housing than has previously been possible.

Other objects and advantages of my invention will become apparent from the following specification and the accompanying drawing, which is for the purpose of illustration only, and in which:

Fig. 1 is a side elevational view of a motion picture film-viewing apparatus constructed in accordance with my invention;

Fig. 2 is a partly front elevational, partly sectional view of the apparatus shown in Fig. 1;

Fig. 3 is a vertical sectional view taken on broken line 3—3 of Fig. 2;

Fig. 4 is an enlarged, fragmentary sectional view showing the film in contact with the film-retarding means of my invention;

Fig. 5 is an enlarged fragmentary sectional view showing the film at another point in reference to the film-retarding means;

Figs. 6, 7 and 8 are perspective views showing the manner in which an individual tooth of the sprocket successively frictionally engages the edge of the film to hold it motionless in cooperation with the film-retarding means, is received in an opening in the edge of the film and moves the film one frame prior to becoming disengaged from said opening; and Fig. 9 is a side elevational view taken from the broken line 9—9 of Fig. 5.

Illustrated in the drawing is a motion picture viewing apparatus 10 which is exemplified by a housing 11 which may be formed of plastic or similar material and which has a peripheral wall 12 bounded by side walls 13 and 14. The housing 11 is provided with a reduced lower portion 15 which is of irregular contour and which permits the housing 11 to be easily and securely grasped in the hand of the user. In addition, the reduced configuration of the lower portion 15 of the housing 11 insures that the housing will be held by the lower portion 15, for a purpose which will be described in greater detail below. The side wall 14 of the housing 11 is constituted by a removable cover 16 which is provided with a plurality of pins 17 adapted to frictionally engage openings 18 which are formed in the edge of the peripheral wall 12 at spaced intervals thereof. Thus, the cover 16 may be readily removed and replaced on the body of the housing 11 to facilitate the removal from and insertion in the housing of film. Of course, the cover may be mounted upon the housing by hinges or other conventional means.

Formed in the peripheral wall 12 of the housing 11 immediately above the reduced lower portion 15 of said housing is a film-viewing aperture 20 through which a film mounted within the housing may be viewed. A light-receiving opening 22 which is shielded by a pane of transparent plastic or similar material permits the entry of light into the interior of the housing 11. The light-receiving opening 22 is formed in the removable cover 16 adjacent the film-viewing aperture 20 and is located in the cover 16 at a point above the reduced lower portion 15 of the housing 11. Since the natural tendency of an individual utilizing the film viewer 10 is to grasp the housing 11 by its reduced lower portion 15 the unobstructed access of light to the interior of the housing 11 by means of the light-admitting opening 22 and the translucent pane 23 is insured.

It is conceivable that the cover 16 on the housing 11 itself be formed of translucent or transparent material to permit the entry of light into the interior of the housing 11.

An eye piece 24 is attached to or formed integrally with the body of the housing 11 adjacent the film-viewing aperture 20 and mounts a meniscus lens 26 therein which is adapted to enlarge and clarify the image formed upon the film mounted in the housing 11. Disposed within the housing 11 is a substantially arcuate baffle 27, one edge of which is secured to the interior surface of the side wall 13 of the housing 11. The upper end 28 and the lower end 29 of the baffle 27 are positioned in close contiguity to the inner surface of the peripheral wall 12 of the housing 11 and are obliquely cut so that the lower portions of the ends impinge on adjacent areas of the peripheral wall 12. The baffle 27 provides an inner, light-reflecting surface 30 which may be constituted by a layer of foil or similar light-reflecting material deposited upon the inner surface of the baffle. It is also conceivable that the baffle may be formed of a material having a high reflective characteristic such as polished stainless steel or polished aluminum.

The baffle 27 serves to divide the interior of the housing 11 into a first, film-viewing chamber 32 and a second, film-containing chamber 34. The baffle 27 is so situated within the housing 11 with respect to the light-admitting opening 22 that it serves to segregate the opening 22 from communication with the interior of the second, film-containing chamber 34 and because of its arcuate configuration causes the rays of light penetrating through the translucent pane 23 to impinge upon the interior of the housing 11 in the region of the film viewing aperture 20.

The film-containing chamber 34 is adapted to receive the greater portion of an endless length of film 36 which is provided with a plurality of spaced openings 37 along the edges thereof. As is best shown in Fig. 3 of the drawing, the web of film 36 is inserted in the body of the housing 11 by merely threading the film through in the space between the ends 28 and 29 of the baffle 27 and then inserting the rest of the film in a looped manner in the film-containing chamber 34. By such a construction the insertion of a web 35 of film by children is rendered feasible and the possibility that the film may be injured due to inaccurate insertion in the apparatus is eliminated. It should also be noted that the portion of the film which is housed within the film-containing chamber 34 is automatically disposed in convolutions which cause adjacent surfaces of the film to engage the interior surface of the peripheral wall 12 and also cause adjacent loops of film to frictionally engage one another. The frictional contact of the film with the walls of the housing and with individual loops serves a purpose which will be described in greater detail below.

To prevent the excessive frictional contact of the film with the inner surface of the peripheral wall 12 of the housing 11 a plurality of spaced film-directing or positioning means 38 constituted by bosses 39 serves to deflect the film outwardly into the interior of the housing 11 and prevent excessive contact with the wall of the film-containing chamber 34 which might create excessive drag upon the film 35. It should be noted, as best shown in Fig. 2 of the drawing, that the width of both the first, film-viewing chamber 32 and the width of the second, film-containing chamber 34 are substantially equal to the width of the film which is adapted to be utilized in the viewer. This is in direct contrast to many types of film viewers which have elaborate film coiling arrangements which require the use of a housing at least twice the width of the film utilized. Thus, in my invention the entire length of the film lies in the same plane.

Mounted within the first, film-viewing chamber 32 is a film-moving means 40 constituted by a sprocket 41 having a plurality of spaced teeth 42 formed integrally with its periphery. The distance between the teeth 42 of the sprocket 41, as best shown in Figs. 7 and 8 of the drawing, is substantially equal to at least twice the distance between adjacent openings 37 formed in the edges of the film 36. The sprocket 41 is provided with a centrally located hub 43 mounted upon a rotatable spindle 44 which has integrally formed therewith a crank 45 positioned exteriorly of the housing 11 and adapted to be rotated in a bearing box 46 mounted upon the side wall 13 of the housing 11.

Mounted on the inner surface of the peripheral wall 12 in the first, film-viewing chamber 32 adjacent the film-viewing aperture 20 is an elongated guide member 50 which is provided with an elongated slot 51 adapted to receive an edge of the film 36. The upper and lower ends of the elongated guide member 50 extend above and below the film-viewing aperture 20. Provided within the film-viewing chamber 32 adjacent the upper and lower ends 28 and 29 of the baffle 27 are guide means 53 constituted by flat pads 54 formed of plastic or similar material over which the edge of film opposite the edge which is threaded through the slot 51 in the elongated guide 50 is adapted to ride. Thus, the film is transversely compressed between the pads 54 and the elongated guide 50 to insure that the edge of the film passing through the slot 51 in the guide 50 will be accurately aligned therein to prevent the inward deflection of the surface of the film away from registry with the film-viewing aperture 20. In this manner the possibility that light will strike the face of the film and be reflected therefrom to render difficult the perception of the image thereupon is obviated. The close contact of the film with the film-viewing aperture prevents such reflection and is an important feature of my invention.

Formed in the inner surface of the peripheral wall 12 of the housing 11 adjacent the film-viewing aperture 20 is a film-retarding means 56 which is constituted by an elongated, vertical groove 57 of arcuate cross section which is generally concentric with the sprocket 41. As may be best seen from Figs. 3 through 5 of the drawing, the teeth 42 of the sprocket 41 are adapted at various stages in the movement of the film, either to force the edge of the film into frictional contact with the wall of the groove 57 to prevent the inadvertent movement of the film or to engage one of the openings 37 in the film to cause the movement of a frame of the film out of registry with the film viewing aperture 20. Therefore, the primary function of the film-retarding groove 57 is to permit the portion of the film which lies between adjacent openings along the edge of the film to be urged into frictional contact with the surface of the groove 57 to hold the film against inadvertent movement by teeth 42 of the sprocket 41 which have not engaged the openings 37 in the edges of the film 36.

When it is desired to remove the film 36 from the interior of the housing 11 the cover 16 is disengaged from its frictional mounting upon the body of the housing 11 and the film is removed from engagement with the sprocket wheel 41 and lifted from the film-containing chamber 34. A new web of film 36 may then be inserted by simply threading the film between the pads 54 and the elongated guide 50 and between the inner surface of the peripheral wall 12 and the upper and lower ends 28 and 29 of the arcuate baffle 27. The bulk of the film is then merely looped or fitted into the film-containing chamber 34 with the loops in a haphazard state. The simplicity of the manner of securing the film within the housing 11 of the apparatus 10 is one of the greatest advantages of my invention and cannot be too greatly stressed since it renders the use of the camera by very young children feasible.

After the film has been inserted within the housing 11 with a comparatively short portion of its length disposed adjacent the film-viewing aperture 20 and within the confines of the film-viewing chamber 32 and with the major portion of its length disposed within the film-containing chamber 34 the cover 16 is once again installed upon the body 11 of the housing.

The crank 35 is then rotated to cause the intermittent movement of the film 36 by means of the sprocket 41 and the teeth 42 formed upon the periphery of said sprocket.

The rotation of the sprocket 14, as best seen in Figs. 3 through 8, causes the individual teeth 42 of the sprocket to be brought into proximity to the edge of the film 36, and, ultimately, into engagement with the openings 37 in the edge of the film 36. As indicated previously, the space between the individual teeth 42 of the sprocket 41 is twice as great as the distance between the openings 37 in the edge of the film 36. In order to secure the intermittent motion which is necessary for the proper viewing of the individual frames upon the film 36 it is desirable that the individual teeth 42 of the sprocket 41 engage one of the openings 37 immediately adjacent the base of the film-viewing aperture 20 and release the same opening 37 when the opening has been brought to the top of the film-viewing aperture 20 and another frame has thus been registered with the film-viewing aperture 20.

The sequence of movement of an individual sprocket tooth X in reference to an individual opening O is most clearly shown in Figs. 6 through 8 of the drawing. As the sprocket 41 is rotated the tooth X is brought into frictional engagement with the surface of the edge of the film between the opening O which it is about to engage and the adjacent opening. Since a frame of film is in registry with the film-viewing aperture 20 it is desirable that the film be held against movement during the viewing. Since the frictional contact of the tooth X with the surface of the edge of the film 36 would normally cause the movement thereof the film-retarding means 56 is provided to frictionally retard such movement.

The tooth X impinges upon the surface of the edge of the film over the arcuate groove 57 which constitutes the film-retarding means 56 and exerts a wedging action upon the film which causes it to be driven into frictional contact with the interior surface of the groove 57, in the manner best shown in Fig. 4 of the drawing. In this way the inadvertent shifting of the film by the frictional contact of the tooth X is eliminated and the frame which is in registry with the film-viewing opening 20 is held motionless until the tooth X engages the opening O, as indicated in Fig. 7 of the drawing.

When the tooth X engages the opening O immediately adjacent the lower edge of the film-viewing aperture 20, the frame of film in registry with said aperture is shifted out of registry therewith and the frame of film below the opening O is carried into registry with the film-viewing aperture 20. As best shown in Fig. 8, when the tooth X reaches the upper edge of the film-viewing aperture 20 it leaves the opening O and the frame of film in registry with the film viewing aperture 20. Immediately subsequent to the movement of the tooth X out of the opening O the following tooth impinges upon the surface of the edge of the film and drives it into frictional contact with the surface of the outward groove 57 to hold the frame of film motionless in registry with the film-viewing aperture 20. In this manner the inadvertent shifting of a frame of film which is momentarily placed in registry with the film-viewing aperture 20 is obviated and a positive frictional locking of the film in the groove 57 is achieved by the action of the individual teeth prior to engaging the openings in the edge of the film. Therefore, the same sprocket tooth which is subsequently to move the film frame which is in registry with the film-viewing opening 20 initially serves to hold the frame of film in registry with the film-viewing opening 20 by locking the edge of the film below said frame into frictional contact with the groove 57 which serves as the film-retarding means of my invention. This is an extremely important aspect of my invention because the inadvertent shifting of the frame of film in registry with the film-viewing opening 20 of the film-viewing apparatus is eliminated and a clear image is achieved. Although the film-retarding means 56 is the primary cause of the frictional retardation of the film during its intermittent movement across the film-viewing aperture as induced by the individual teeth 42 of the sprocket 41, the transverse compression of the film between the slot 51 in the elongated guide 50 and the guide pads 54 is also a factor in preventing the inadvertent shifting of the film. As indicated previously, the frictional contact of the convolutions of the film within the film-containing chamber 34 with the inner surface of the walls of said chamber and with the individual surfaces of one another induces a certain frictional restraining action which beneficially assists the film-retarding means 56 in holding the film frame motionless during the viewing period.

However, it has been found that the excessive frictional contact of the surface of the film with the surface of the walls of the film-containing chamber 34 will induce a drag in the film and will occasionally cause a sprocket tooth 42 to drop from the opening 37 of the film 36 in which it is engaged before a film frame has been accurately registered with the film-viewing opening 20. To prevent such excessive frictional contact of the surface of the film with the walls of the film-containing chamber 34 I provide the spaced film-directing means 38 which are constituted by the bosses 39 distributed upon the inner surface of the peripheral wall 12 of the housing 11. As best shown in Fig. 3 of the drawing, the film-directing means 38 serve to drive the film out of contact with the inner surface of the peripheral wall 12 of the housing 11, and thus prevent excessive frictional drag existing between said surface and the surface of the film.

Another aspect of my invention which is extremely important is the fact that the respective frame of film, by the action of the film-retarding means 56 and the elongated film guide 50 and the film guide pads 54, is held firmly in registry with the film-viewing aperture 20 and no buckling or flickering of the film adjacent the film-viewing aperture 20 is possible. In addition, the manner in which the light is fed to the rear of the film through the concentration of the light rays thereupon by the light-reflecting interior surface 30 of the arcuate baffle 27 contributes to a clear image and one which receives a maximum light intensity through the opening 22. This clear image is partly the result of the close juxtaposition of the light-admitting opening 22 to the film-viewing aperture 20 and is an important feature of my invention.

Although I have shown and described a specific embodiment of my invention for the purpose of illustrating the manner of construction and mode of operation thereof, it is obvious that changes, modifications and alterations may be made in the specific elements and details of the embodiment and I, therefore, do not intend my invention to be limited to such specific details and elements but prefer rather to be afforded the full scope of the patent claims.

I claim as my invention:

1. In a motion picture viewing apparatus: a housing having a film-viewing aperture formed in the peripheral wall thereof and a light-admitting means formed in a side wall thereof; a baffle disposed within said housing adjacent said light-admitting means and serving to divide said housing into a first, substantially closed, film-viewing chamber and a second, film-receiving chamber; and a sprocket completely enclosed within said first chamber adapted to intermittently move said film across said aperture.

2. An apparatus as defined in claim 1 in which an elongated guide adapted to receive one edge of said film is positioned in said housing adjacent said aperture.

3. An apparatus as defined in claim 2 in which the upper and lower ends of said guide are spaced a substantial distance from the ends of said baffle.

4. An apparatus as defined in claim 3 in which spaced guide means positioned above and below the ends of said elongated guide are adapted to contact the opposite edge of said film to urge said one edge into engagement with said elongated guide.

5. An apparatus as defined in claim 4 in which said guide means are constituted by pads mounted on the wall of said film-viewing chamber adjacent the ends of said baffle.

6. A motion picture viewing apparatus including: a housing having a film-viewing aperture formed in a peripheral wall thereof and a light-admitting means formed in a side wall thereof adjacent said apertures; a baffle mounted within said housing adjacent said light-admitting means and defining a first, substantially closed, film-viewing chamber having its forward wall constituted by a portion of the peripheral wall of said housing and adapted to receive the light from said light-admitting means and a second, film-containing chamber adapted to receive the greater portion of the length of said film; a sprocket completely housed in said film-viewing chamber adapted to intermittently move said film across said aperture positioned in said first chamber; and a film-retarding means formed in the peripheral wall of said film-viewing chamber adjacent said aperture adapted to retard said film to prevent the inadvertent movement of said film across said aperture by said sprocket.

7. An apparatus as defined in claim 6 in which said film-retarding means is adapted to receive a portion of said film adjacent one edge thereof when said film is urged into said film-retarding means by said sprocket.

8. An apparatus as defined in claim 6 in which said film-retarding means is constituted by a groove formed adjacent said aperture and adapted to receive a portion of said film adjacent the edge of said film to frictionally engage said film and prevent the inadvertent movement thereof by said sprocket.

9. In a motion picture viewing apparatus: a housing having a film-viewing aperture and light admitting means; a baffle element disposed within said housing and adjacent said light admitting means and acting to divide said housing into a first substantially closed film-viewing chamber and a second film-containing chamber; film moving means completely enclosed in said film-viewing chamber adapted to cause the intermittent movement of said film across said aperture; and film directing means formed integrally with the peripheral wall of said second chamber and consisting of a plurality of spaced protuberances for causing said film to be moved out of contact with said peripheral wall to form said film into multiple irregular loops within said second chamber.

10. In a motion picture viewing apparatus: a housing having a film-viewing aperture and light-admitting means; an arcuate baffle element disposed within said housing adjacent said light-admitting means acting to divide said housing into a first, substantially closed, film-viewing chamber and a second film-containing chamber; film moving means enclosed within said film-viewing chamber for causing intermittent movement of said film across said aperture; and a plurality of film directing means formed upon the peripheral wall of said film-containing chamber for separating said film from continuous contact with the surface of said peripheral wall.

11. In a motion picture viewing apparatus: a housing having a film-viewing aperture formed in a peripheral wall thereof and a light-admitting opening formed in a side wall thereof adjacent said aperture; a sprocket mounted for rotation in said housing adjacent said aperture to cause movement of a film past said film-viewing aperture; and film-retarding means for retarding movement of said film past said film-viewing aperture, said film-retarding means being constituted by a groove formed in the surface of said peripheral wall adjacent said aperture and said sprocket being adapted to urge a portion of said film into frictional engagement with said groove to cause a frame of said film to be held in registry with said aperture when said sprocket engages an edge of said film.

12. An apparatus as defined in claim 11 in which said groove is of arcuate cross section.

HARPER ROISMAN.

REFERENCES CITED

The following references are of record in the file of this patent:

UNITED STATES PATENTS

| Number | Name | Date |
| --- | --- | --- |
| 764,788 | Armat | July 12, 1904 |
| 1,350,374 | Michalek | Aug. 24, 1920 |
| 1,957,378 | Zimmerman | May 1, 1934 |
| 1,999,133 | Shapiro | Apr. 23, 1935 |
| 2,311,204 | Bouma | Feb. 16, 1943 |
| 2,408,384 | Farrell | Oct. 1, 1946 |
| 2,449,483 | Iwick | Sept. 14, 1948 |